Patented July 4, 1939

2,164,943

UNITED STATES PATENT OFFICE 2,164,943

PREPARATION OF CALCIUM CARBONATE

Howard Roderick, Grosse Ile, Mich., assignor to Michigan Alkali Company, Wyandotte, Mich., a corporation of Michigan No Drawing. Application August 27, 1936, Serial No. 98,202

9 Claims. (Cl. 23—66)

Calcium carbonate, and particularly the artificially formed material, has long been known as a filler for rubber, plaster, plates, etc. Thus, for instance, in accordance with United States Patent No. 796,683, there is known the precipitation of calcium carbonate by action of liquors containing ammonium bicarbonate on calcium chloride liquor, and again in United States Patent No. 805,581 the precipitation of calcium carbonate by action of ammonia gas and carbonic acid simultaneously on a concentrated solution of calcium chloride concentrated from waste liquors of the ammonia-soda process. The prior known precipitated calcium carbonate has, however, been of quite coarse grade, impossible of application in fine usages where relatively large particle size is impossible, as for instance in treatment of casein in paper-coating, treatment of artificial filaments, etc. In accordance with the present invention, it now becomes possible to attain a calcium carbonate in a form of such minuteness of subdivision as to exceed microscopic resolution if desired, and permitting a particularly accurate control or adjustment of particle size as may be desired.

To the accomplishment of the foregoing and related ends, the invention, then comprises the features hereinafter fully described, and particularly pointed out in the claims, the following description setting forth in detail certain illustrative embodiments of the invention, these being indicative, however, of but a few of the various ways in which the principle of the invention may be employed.

In accordance with the invention, calcium chloride and sodium hydroxide are reacted between, in solution, under certain prescribed conditions, forming a controlled suspension which is converted into carbonate form. Calcium chloride in relatively pure state may be dissolved in water to suitable concentration, or preferably an available calcium chloride solution, as for instance from the distillers in the ammonia-soda process, may be employed. The amount of calcium chloride should rate desirably about 100 grams per liter. For reaction with the sodium hydroxide, the latter is required in solution form at the rate of about 50 grams per liter. The mixing of sodium hydroxide should be carried out quite rapidly, and while either reagent may be stirred into the other, it is preferable to add calcium chloride solution to sodium hydroxide solution. Desirably, the addition is made by dumping the one solution into the other rapidly, and vigorously stirring. The temperature in the reaction zone is important. For the preparation of a product of particular quality it should be on the order of 85–100° F. Using respective solutions of calcium chloride and sodium hydroxide, the temperatures of each may be correlated as desired, to obtain the reaction-zone temperature indicated, and where a hot soda hydroxide solution is the form available, it may be preliminarily cooled, as by flowage through a cooling zone, or the temperature of the calcium chloride solution added may be proportionately lower; and vice versa, where the calcium chloride solution happens to be of relatively high temperature, as for instance calcium chloride liquor coming directly from ammonia distillers, such liquor may be cooled down, as by flowage through a cooling coil, or the caustic soda solution may compensatively be of lower temperature. A particularly satisfactory procedure involves flowing calcium chloride liquor from the ammonia distiller, and having a temperature of about 165° F., through a cooling coil reducing the temperature to 85–100° F. into a measuring tank, and thence rapidly into a tank of sodium hydroxide solution which has been similarly adjusted to 85–100° F., the mixture being then well agitated and flowed to a carbonating zone, which preferably may be in the form of a carbonating tower wherein the suspension of calcium hydroxide formed by the reaction is brought into counter-current exposure to carbon dioxide, thereby converting the minute suspended particles to calcium carbonate, which, passing through a settling zone and a filter, is well washed to remove contamination of sodium chloride, etc., and the calcium carbonate is had in paste form. It is a peculiarity of the product in accordance herewith, that if it be allowed to dry, it forms a hard dense bony mass which cannot be re-disseminated in water. Accordingly, for most purposes of usage it is to be maintained in paste form, for instance a 50 per cent aqueous paste being convenient, and such paste allowing of ready thinning up as may be desired, with maintenance of the individual hyper-minute particle form.

The characteristics of the product evidently are dependent in large part upon the control conditions had in the first reaction stage. Correspondingly, great care is taken here in attaining the requisite conditions. As pointed out, it is operatively convenient to employ a calcium chloride concentration of about 100 grams per liter, and a sodium hydroxide concentration of about 50 grams per liter. If higher concentrations, as for instance up to 150–200 grams per liter of calcium chloride and up to 75 grams per liter of sodium hydroxide be employed, operation though possible is somewhat handicapped by the production of such a thick suspension of calcium hydroxide, so as to require its being diluted down again before entrance into the carbonating zone. In most cases, this is less desirable than the preferred procedure as set forth.

The temperature, within limits, if varied, very materially varies the character of the product. Thus, where operating in the reaction between calcium chloride and sodium hydroxide at a temperature of 85° F., the ultimate calcium carbonate obtained is of particularly hyper-minute particle character. Examination under a microscope at 1500 diameters is insufficient for resolution into visible particle form, the particles being not larger than one-fourth micron and on colloidal order. If the temperature in the reaction zone be about 100° F., the particle size in the product is somewhat larger, around one micron.

It is also noted that where the calcium chloride solution is that derived from the ammonia-soda process, such solution contains a relatively small proportion of calcium sulphate, a typical analysis of such calcium chloride liquor, after the solids have been removed and at a temperature of 150° F., being 100 grams of $CaCl_2$, 60 grams of NaCl and 1.25 grams of $CaSO_4$ per liter. All of the foregoing substances are soluble salts and the solution is in equilibrium with respect to the calcium sulphate, so that when the liquor is cooled rather suddenly to 85° F., a condition of supersaturation is brought about with respect to the calcium sulphate which is fairly stable. I have found that if this liquor is allowed to stand for several days, crystallization of such sulphate takes place and a new equilibrium point is attained at that temperature, whereupon it is impossible to precipitate the fine calcium carbonate under any condition. This would indicate that using the calcium chloride liquor after cooling, and while in a state of supersaturation with respect to the calcium sulphate, is a desirable, if not a necessary, condition for the production of the fine particle size calcium carbonate. It is possible that under the conditions stated, the very fine particles of calcium sulphate exist in the solution and that these act as nuclei for the precipitation of the calcium carbonate or inhibit growth of the calcium carbonate crystals and thus determine its particle size.

While in the carbonation, reaction by alkali metal carbonate might be had, it is preferable to employ carbon dioxide gas, and desirably in high concentration, as for instance 100 per cent $CO_2$, although in some instances lower dilutions, as down to 30 per cent, or still less desirably combustion gases of around 12 per cent or more content. In the carbonating zone, the time ranges from about 20 minutes to 2 or 3 times such amount, although in general the shortest time possible is desirable.

Products in accordance with the present invention are of such hyper-minute fineness as to be applicable in paper-coating. In this, it is required that the finished coat shall provide particular qualities with relation to the amount of casein, for instance the usual binder, required to bind the material to the sheet. Further requirements are ink-receptivity and brightness. The calcium carbonate as prepared by operating the reaction between the calcium chloride and the sodium hydroxide at a temperature of 85° F. has a casein requirement around 8 per cent. A reaction product at 100° F. has a casein requirement of around 25 per cent. The ink-receptivity and the brightness rate somewhat better with the product prepared around 100° F., while the casein requirement is favored in the product prepared around 85° F. The amount of casein has importance in an economic sense, in that other things equal, the smaller the amount required in the make up of the coating, the greater the saving in cost of an expensive component. While in accordance with the process, an acceptable product may be obtained by operating the calcium chloride and sodium hydroxide reaction at an intermediate point in the above-stated temperature range, in practice it is convenient to make respective batches operating at around 85° F. and around 100° F. separately, and then mixing these. For instance, such mixed in equal parts give a calcium carbonate product which has high standard of ink-receptivity and brightness, coupled with the very satisfactory casein requirement of 15 per cent. It may be explained that the casein requirement is closely related to the rate of settling of calcium carbonate particles as suspended in water, and this in fact provides the practical test which is applied for determination of the casein requirement.

The product in accordance with the present invention then, is characterized by being chemically pure $CaCO_3$, and under microscopic examination shows from ultra-minute crystals barely identifiable at 1500 diameters magnification down to indistinguishable amorphous fields. By measurement the particle size is one micron down to one-fourth micron or less. Rated by tests employed in the industry, the product shows a sedimentation rate of 30–60, reduced casein-requirement, as well as increased ink-receptivity and greater brightness when actually applied as a coating ingredient.

It may be noted that the sedimentation test is performed by mixing two grams of the calcium carbonate, dry basis, in a 100 cc. graduate of distilled water, and after thorough agitation in suspension, allowing to settle 24 hours. The coarser the particles the more complete the settling, and the smaller the bulk occupied in the graduate in which the test is carried out. The commercially employed calcium carbonate heretofore has shown a sedimentation of 12. That is, in 24 hours the material has settled down in the bottom of the graduate to a volume of 12 cc. The product in the present invention similarly tested, shows settling into a volume of 30–60 cc., the particle size thus being correspondingly that much finer than the present commercial calcium carbonate.

To determine the casein requirement, coating mixtures are made up with various casein contents and the coating mixtures then applied on two sheets of paper. The paper sheets thus coated are allowed to dry, after which they are submitted to the standard wax test, to determine how strongly the coat is bound to the sheet. This is determined by placing on each sheet of paper a set of standard waxes while hot, allowing them to stand fifteen minutes, then pulling them off, noting which wax "picked" the coating material from this sheet. The waxes are numbered in order of their tenacity for the coating material, such that the higher the number of wax reached before "picking" is noticed, the more firmly held is the coating material. With a coating mixture made of clay and the present improved $CaCO_3$ (50 grams each) and 15% casein on the weight of clay plus the CaCO3 "pick" is not noticeable until on the #5 wax, whereas with other types of CaCO3 of larger particle size "pick" will be noticed on the #1 or #2 wax, indicating that more casein must be added to such samples, if no "pick" is to be observed previous to the #5 wax.

The ink-receptivity test consists in making up the calcium carbonate with a sufficient per cent of casein in a coating mixture to properly coat the paper, and coating this on paper, allowing to dry, and then a blue-printing ink is applied to the coated surface in smears and is wiped off, and the depth of color remaining is a gauge of the degree to which the ink will set in on the coating.

The brightness test consists in subjecting sheets coated as for the ink-receptivity test, to a rating in a reflectometer, which throws a standard light on the coated sheet, and the amount of light reflected back is read in comparison with the initial standard taken as 100.

Other modes of applying the principle of the invention may be employed, change being made as regards the details described, provided the features stated in any of the following claims, or the equivalent of such, be employed.

I therefore particularly point out and distinctly claim as my invention:

1. A process of making calcium carbonate in fine particle size, which comprises adding a caustic soda solution containing about 50 grams per liter to a calcium chloride solution from ammonia-soda operation and containing about 100 grams per liter, quickly mixing while maintaining a temperature of 85–100° F., and then carbonating the suspension so formed, separating the precipitate, and washing.

2. A process of making calcium carbonate in fine particle size, which comprises adding calcium chloride solution containing about 100 grams per liter to sodium hydroxide solution containing about 50 grams per liter, with rapid mixture, the temperature of precipitation being about 85° F., and then carbonating the suspension so formed, separating the precipitate, and washing.

3. A process of making calcium carbonate in fine particle size, which comprises adding calcium chloride solution containing about 100 grams per liter to sodium hydroxide solution containing about 50 grams per liter, with rapid mixture, the temperature of precipitation being about 100° F., and then carbonating the suspension so formed, separating the precipitate, and washing.

4. A process of making calcium carbonate in fine particle size, which comprises adding calcium chloride solution containing about 100 grams per liter to sodium hydroxide solution containing about 50 grams per liter, with rapid mixture, the temperature of precipitation being about 85–100° F., and then carbonating the suspension so formed, separating the precipitate, and washing.

5. A process of making calcium carbonate in fine particle size, which comprises reacting between calcium chloride and sodium hydroxide, in solution in amounts of about 100 grams per liter and about 50 grams per liter respectively, and the temperature of precipitation about 85° F., and then converting the suspension so formed into the carbonate.

6. A process of making calcium carbonate in fine particle size, which comprises reacting between calcium chloride and sodium hydroxide, in solution in amounts of about 100 grams per liter and about 50 grams per liter respectively, and the temperature of precipitation about 100° F., and then converting the suspension so formed into the carbonate.

7. A process of making calcium carbonate in fine particle size, which comprises reacting between calcium chloride and sodium hydroxide, in solution in amounts of about 100 grams per liter and about 50 grams per liter respectively, and the temperature of precipitation about 85–100° F., and then converting the suspension so formed into the carbonate.

8. A process of making calcium carbonate in fine particle size, which comprises reacting between calcium chloride and sodium hydroxide in solution in amounts of about 100 grams per liter and 50 grams per liter respectively, such solution also containing a relatively small amount of calcium sulphate and the temperature of precipitation being about 85–100° F., and then converting the suspension so formed into the carbonate.

9. In a process of making calcium carbonate in fine particle size, reacting between calcium chloride and sodium hydroxide in solution, at a temperature of 85 to 100° F., the concentration of the calcium chloride being substantially twice that of the sodium hydroxide, and then treating the so-formed calcium hydroxide suspension with carbon dioxide gas, to convert the particles of suspension to calcium carbonate.

HOWARD RODERICK.